(12) United States Patent
Plummer et al.

(10) Patent No.: US 10,202,736 B1
(45) Date of Patent: Feb. 12, 2019

(54) MONOLITHIC MANHOLE FABRIC AND METHOD

(71) Applicants: Todd Plummer, Byron Center, MI (US); David C Van Dyken, Dorr, MI (US)

(72) Inventors: Todd Plummer, Byron Center, MI (US); David C Van Dyken, Dorr, MI (US)

(73) Assignee: Plummer's Environmental Services, LLC, Byron Center, MI (US)

( * ) Notice: Subject to any disclaimer, the term of this patent is extended or adjusted under 35 U.S.C. 154(b) by 200 days.

(21) Appl. No.: 15/368,883

(22) Filed: Dec. 5, 2016

Related U.S. Application Data

(60) Provisional application No. 62/271,385, filed on Dec. 28, 2015.

(51) Int. Cl.
*F16L 55/18* (2006.01)
*E02D 29/12* (2006.01)
*F16L 55/165* (2006.01)

(52) U.S. Cl.
CPC ......... *E02D 29/125* (2013.01); *E02D 29/128* (2013.01); *F16L 55/165* (2013.01)

(58) Field of Classification Search
CPC .......................... F16L 55/1651; F16L 55/1656
USPC .......... 138/97, 98; 405/150.1; 264/269, 270; 156/287
See application file for complete search history.

(56) References Cited

U.S. PATENT DOCUMENTS

| | | | | |
|---|---|---|---|---|
| 6,540,439 B2 * | 4/2003 | De Bruijn | ........... | B29C 63/0086 138/98 |
| 6,634,828 B1 * | 10/2003 | Hovad | ................ | B29C 63/0021 138/97 |
| 6,708,729 B1 * | 3/2004 | Smith | ................. | F16L 55/1651 138/124 |
| 6,923,217 B2 * | 8/2005 | Smith | ................. | F16L 55/1651 138/124 |
| 6,932,116 B2 * | 8/2005 | Smith | ................. | F16L 55/1651 138/124 |
| 7,121,766 B2 * | 10/2006 | De Bruijn | ........... | B29C 63/0086 405/184.2 |
| 7,670,086 B2 * | 3/2010 | Kiest, Jr. | ................. | E02D 29/12 404/25 |
| 7,891,381 B2 * | 2/2011 | Anders | ............... | F16L 55/1656 138/97 |
| 8,616,243 B2 * | 12/2013 | Kiest, Jr. | ............. | F16L 55/1651 138/124 |
| 9,074,338 B2 * | 7/2015 | Kiest, Jr. | ................. | B29C 63/20 |
| 9,074,718 B2 * | 7/2015 | Kiest, Jr. | ............. | F16L 55/1651 |

(Continued)

*Primary Examiner* — Patrick F Brinson
(74) *Attorney, Agent, or Firm* — Kane & Co., PLC; Barry C. Kane

(57) ABSTRACT

The instant invention provides an apparatus and method for renewing and repairing a manhole including the barrel, the plenum, and the chimney, in a single installation to seal off penetration of ground water into the manhole. The manhole repair liner and method utilizes a stretchable liner material which is precut and fused together to loosely approximate the geometry of the manhole. The liner material includes an acid-resistant layer made from an elastic closed-cell polymeric material. Included and fixed to one side or surface of the elastic liner is a felt, or other loosely woven or organized fabric of fibers intended to receive and retain in place a resin, which when cured, fixes the shape of the liner in position.

18 Claims, 4 Drawing Sheets

(56) References Cited

U.S. PATENT DOCUMENTS

2007/0113971 A1\* 5/2007 Driver .................. B29D 23/001
  156/287
2010/0243091 A1\* 9/2010 D'Hulster ........... F16L 55/1651
  138/97

\* cited by examiner

MONOLITHIC MANHOLE FABRIC AND METHOD

CROSS REFERENCE TO RELATED APPLICATION

This application claims the benefit of U.S. Provisional Application No. 62/271,385, filed Dec. 28, 2015 pursuant to 35. U.S.C. 119(e), the contents of which are incorporated herein by reference.

BACKGROUND OF THE INVENTION

Field of the Invention

This invention relates to methods and apparatus for relining a manhole, and more particularly to a more universal design and method for expanding a liner bag within and fitting a majority of manhole shapes.

Description of the Related Art

Conventional manholes include a lower or bottom pan, a barrel having a constant diameter adjacent the pan, a concentric or eccentric cone or plenum extending upwardly from the barrel, one or more adjusting rings to adjust the overall height of the manhole, and a casting frame at the top of the adjusting rings to support a lid at an elevation substantially level with the surrounding and overlying pavement. The casting frame is preferably sealed to the uppermost adjusting ring to preclude or minimize water flow into the manhole. The plenum cone and adjusting rings are commonly known as the manhole. Most manhole structures are unique in size and shape, with varying diameters and depths.

The upper portion of the manhole is normally the weakest portion of the structure, due to traffic loading, freeze and thaw, impact from snow plows, and deteriorated small pieces of construction materials used to make the final grade adjustment for the surrounding road. Sub-standard construction methods can also lead to damage or deterioration of the upper manhole structure. Thus, the manhole is vulnerable to allowing surface water and subsidence of soil to enter the manhole, which eventually leads to a structural failure of the manhole.

One method of repairing manholes involves cured-in place liners or sleeves which are custom fit to the diameter of the barrel, plenum, and chimney. This requires, prior to installation, a detailed measurement of the dimensions of the different portions of the manhole. Such customization inherently increases costs for the one-of-a-kind liners.

The custom made liners generally are constructed of materials such as fiberglass or needle-punched felt material and PVC. These materials offer little or no stretching, particularly circumferentially, but do tend to provide longer lasting and stronger solutions. A draw back to these more rigid liners is that it is difficult to correct mistakes in measuring the manhole. When the sleeve is too small, an annulus is created between the liner and the manhole wall which may allow surface water or ground water to penetrate and enter the manhole. When the liner is too large, a fold is created in the liner, which produces a rough inner surface.

One object of the invention is to reduce cost and provide a more universal manhole liner that can be used with confidence for a majority of manhole designs. These and other objections will become apparent from the following description of the invention.

SUMMARY OF THE INVENTION

The instant invention provides an apparatus and method for renewing and repairing a manhole including the barrel, the plenum, and the chimney, in a single installation to seal off penetration of ground water into the manhole. The manhole repair liner and method utilizes a stretchable liner material which is precut and fused together to loosely approximate the geometry of the manhole. The liner material includes an acid-resistant layer made from an elastic closed-cell polymeric material. Included and fixed to one side or surface of the elastic liner is a felt, or other loosely woven or organized fabric of fibers intended to receive and retain in place a resin, which when cured, fixes the shape of the liner in position.

The method includes manufacturing a manhole liner from an elastic acid-resistant membrane having a fibrous outer layer, and which closely approximates the geometry of the manhole to be repaired. Inverting the liner to place the fibrous layer on the inside. Soaking and coating the fibrous material with a curable resin. Dropping the liner into the manhole by inverting the liner turning the inner fibrous layer inside out so as to face the wall of the manhole. Inserting a bladder into the liner and adjacent the elastic acid-resistant layer. Inflating the bladder to expand into the geometry of the manhole and forcing the elastic liner to expand into intimate contact with the walls of the manhole. An finally, allowing or expediting curing of the resin to secure a bond between the manhole wall and rigidly fixing the liner in position.

According to one form of the invention, a liner for a manhole is provided comprising a tubular member having a geometry substantially approximating the geometry of the manhole, the tubular member comprising at least one panel having a plurality of layers including an impermeable inner polymer layer, at least one intermediate and porous felt layer, and an outer structural layer including expandable strands of fiberglass. The outer layer of expandable strands of fiberglass may be achieved using overlapping sheets of fiberglass such that upon expansion of the liner in the manhole, the overlapping sheets of fiberglass slide past each other to accommodate for dimensional changes in said outer layer. Alternatively the outer layer of overlapping fiberglass may include sheets of random oriented fiberglass wherein individual fibers of fiberglass are able to move relative to other fibers. In either embodiment it is envisioned that the outer layer of fiberglass is bonded temporarily to the porous felt layer. The temporary bonding may be achieved in a number of ways including needle punched to the intermediate layer to temporarily maintain a relative position of said outer layer to said intermediate layer. The outer structural layer can also be fixed in rigid relation to the porous felt layer and the impermeable polymer layer by an adhesive.

According to another form of the invention, a liner for a manhole includes a tubular member to be disposed in the manhole, the tubular member having an opening at one end and closed at a second and opposite end. The tubular member is preferably made from a fabric inflatable in a direction perpendicular to a longitudinal axis of the. In this form of the invention, the fabric is comprised of an impermeable polymer inner layer, at least one permeable and porous stretchable intermediate layer; and at least one permeable and porous inelastic outer structural layer formed from a plurality of glass fibers that are able to move relative to one another upon inflation of the tubular member to accommodate expansion of the impermeable inner layer and the stretchable intermediate layer. It is further contemplated the invention comprises an adhesive adhering the stretchable intermediate layer and the outer structural layer to the manhole.

The liner fabric is formed by a plurality of panels, each stitched or fused to an adjacent panel forming an impermeable seam. The outer structural layer is maintained in position relative to the intermediate layer by forcing pieces of the outer structural layer into the intermediate layer. They may be achieved by temporary stitching or fusing the outer structural layer to the intermediate layer. In this form of the invention, the outer structural layer comprises a plurality of sheets of stranded glass fibers overlapping one another by a predetermined distance based upon the amount of expansion of said tubular member when expanded into the manhole. The outer structural layer may be comprised of at least one sheet of randomly oriented stranded fibers loosely associated with one another wherein each randomly oriented stranded fiber is permitted to move relative to one another upon expansion of said tubular member within the manhole. Alternatively, the outer structural layer is permanently affixed relative to the intermediate layer and to the manhole by the adhesive.

In yet another form of the invention, a manhole liner generally in the form of a tube is provided approximating the shape of the manhole. In this form of the invention, the tube includes an impermeable and elastic polymer layer selected from the group of polyvinyl chlorides, polyurethanes, polyvinyl ethylene, and the vinyl chemistry; an intermediate layer selected from the group of randomly oriented fibers including felt; and an outer layer selected from a group of glass fibers including fiberglass. The intermediate layer is maintained in relative position to the outer layer by temporary stitching. The outer layer is temporarily maintained in relative position to the intermediate layer by forcing a plurality of strands of the outer layer into the intermediate layer. Moreover, the outer layer of the fabric is allowed to move relative to the intermediate fabric when the liner is stretched. This is achieved by both the intermediate and the outer layers being porous and permeable.

BRIEF DESCRIPTION OF THE DRAWINGS

The invention can be best understood from the detailed description of the invention below, when taken in combination with the drawing figures.

DETAILED DESCRIPTION OF THE PREFERRED EMBODIMENT

Figure 1:
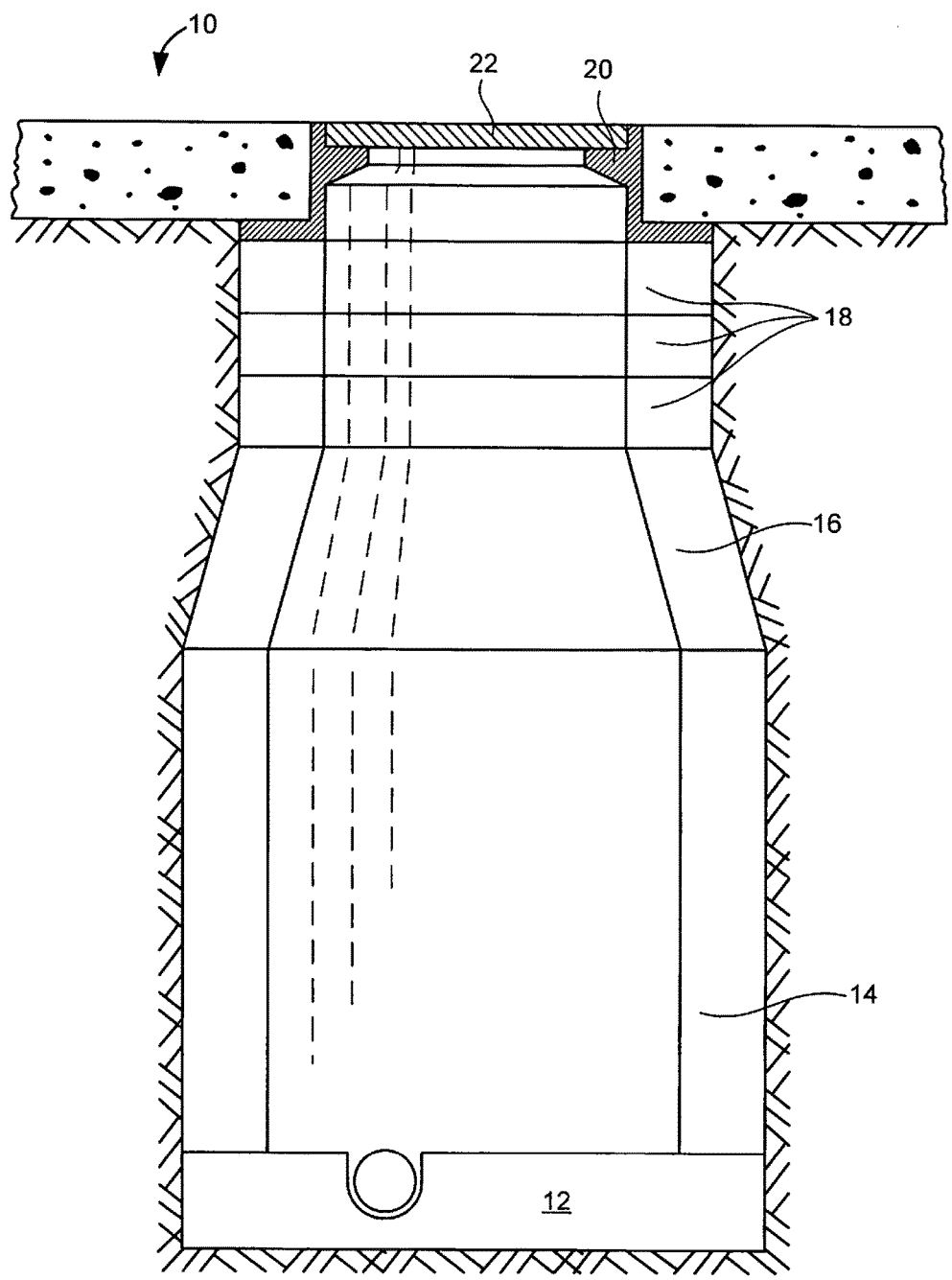
FIG. 1 is a vertical cross-sectional view of a generic manhole having an eccentric conical plenum or transition cone.
Figure 2:
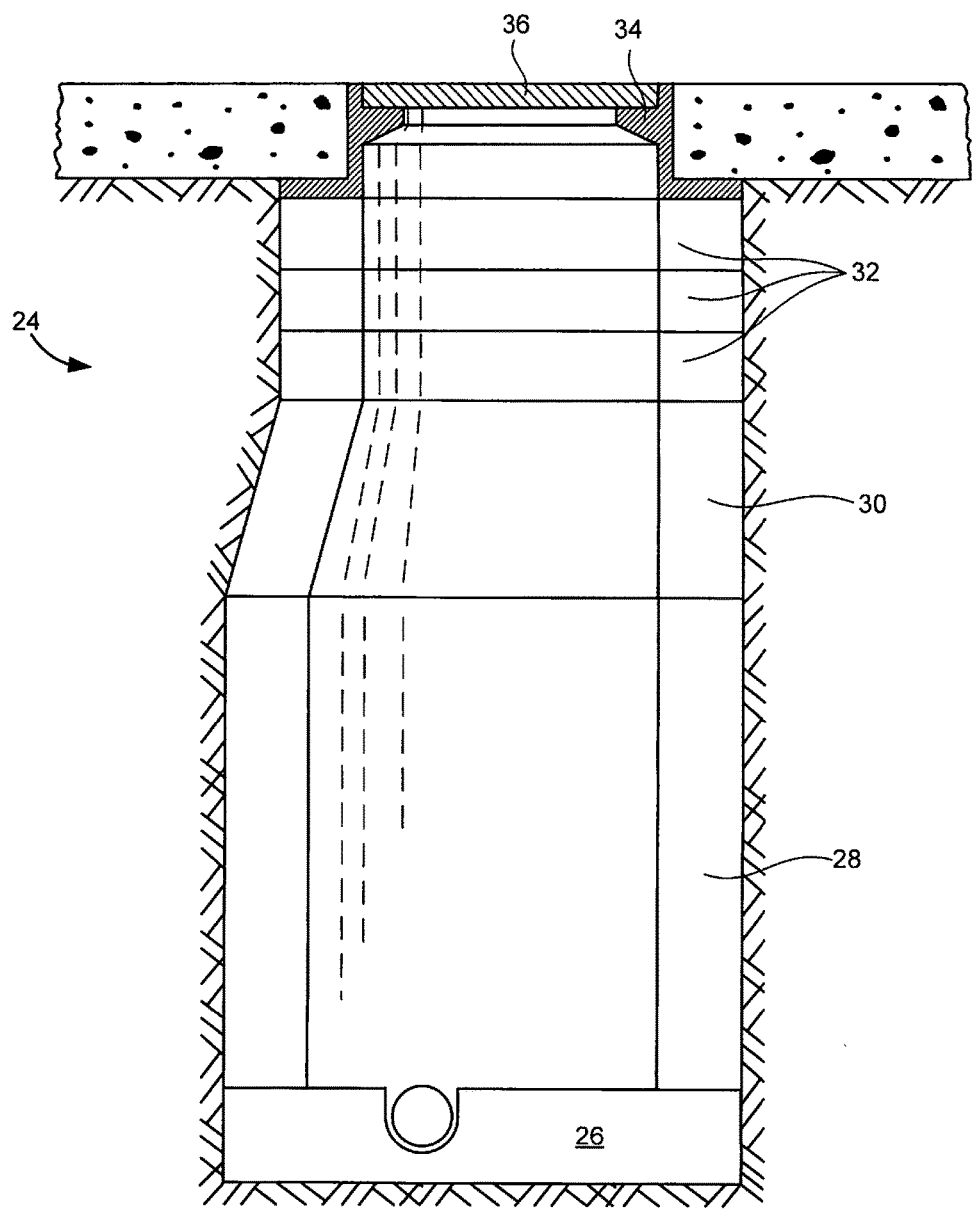
FIG. 2 is a vertical sectional view of a generic manhole having a centric conical plenum or transition.

FIGS. 1 and 2 both provide a vertical cross-sectional view of a manhole of two generally different geometries. Referring to FIG. 1, manhole 10 includes a bottom pad 12, a barrel 14 disposed above and resting on the bottom pad 12, a plenum, corbel or cone 16 disposed on and resting on the barrel 14. Disposed above and resting on corbel 16 is a plurality of adjusting rings 18. An iron casting frame 20 often sits upon the uppermost adjusting ring 18 and supports a lid or manhole cover 22. Casting 20 is normally sealed to the top adjusting ring 18 through mechanical fasteners (not shown) with an intermediate sealer or gasket material (also not shown). It is understood that one or more adjusting rings 18 may be used to adjust the height of the manhole 10 such that the cover 22 is substantially at the level of the surrounding road surface such as concrete or asphalt pavement 24 surrounding the manhole 10.

FIG. 2 shows a slightly different yet rather common alternate geometry for a manhole 24. Just as in FIG. 1, this alternate form includes a fused bottom pad 26, a barrel 28 disposed above and resting on the bottom pad 26, and a plenum, corbel or cone 30 disposed on and resting on the barrel 14. In this instance, corbel 30 asymmetrical in form from one end to another such that the slope or pitch of one segment of the cone is not the same as another segment. In the embodiment shown in FIG. 2, the left hand segment of the cone has a steep pitch while the right hand segment of the corbel wall is substantially vertical and aligned with the wall of the barrel 28.

As in the previous embodiment, disposed above and resting on corbel 30 may be one or more adjusting rings 32. A cast iron ring or frame 34 sits upon the uppermost adjusting ring 32 and supports a lid or manhole cover 36. Casting 34 is sealed to the top adjusting ring 32 through mechanical fasteners (not shown) and with an intermediate sealer or gasket material (also not shown).

Figure 3:
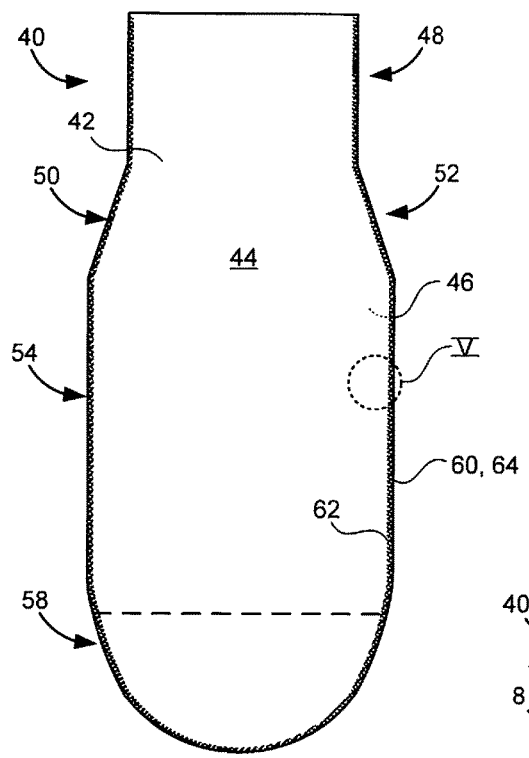
FIG. 3 is a schematic diagram illustrating a pattern for a liner for use in a manhole having an eccentric conical plenum.
Figure 4:
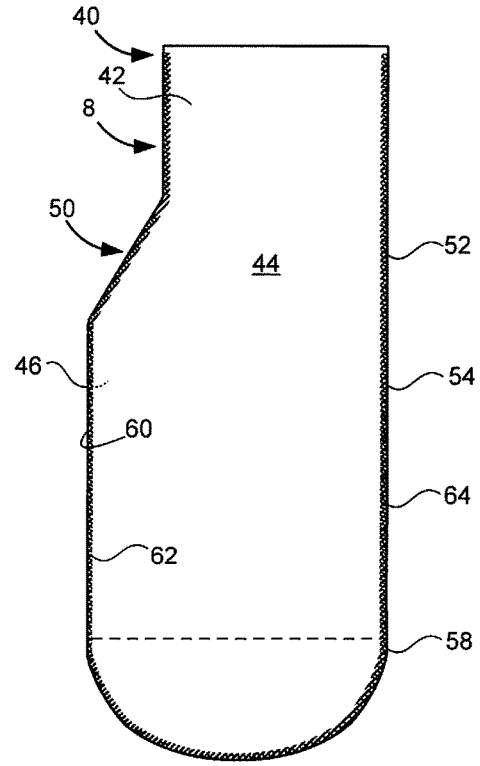
FIG. 4 is a schematic diagram illustrating a pattern for a liner for use in a manhole having an eccentric conical plenum.

The present invention is directed towards a method for repairing and renewing the interior walls of the manholes 10 and 24 described above, from the bottom pad 12, 26 to the cast iron ring 20, 34 using a liner such as shown in FIGS. 3 and 4. For the purposes of the following description, similar numbers will be used to refer to similar structures or features. New numbers will be used to highlight the differences between the two embodiments.

Figure 5:
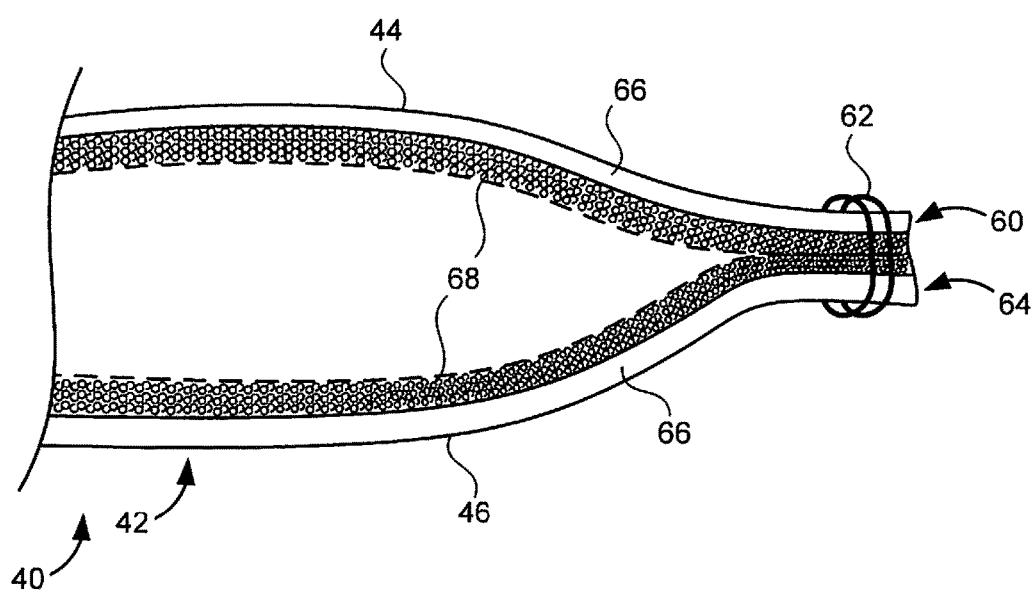
FIG. 5 is a partial cross sectional view of the liner in the circular region designated by Roman numeral V shown in FIG. 3.

Each liner 40 is preferably formed in the shape of a tubular sleeve or sock 42 comprised of at least one sheet of material. For the purposes of this description reference will be made to two sheets of material 44, 46 shown in FIG. 5 as they are illustrative of the seams to form the tube-like structure.

The material is cut into one or more panels or sheets that when put together and expanded, will substantially conform to the interior geometry of the manhole. FIG. 3 illustrates a sleeve profile having a substantially constant diameter upper section 48 intended to conform to the section of the manhole formed by the adjusting rings 18, 32, transitioning to opposing outwardly tapering portions 50, 52 intended to closely approximate the geometry of the symmetrical corbel such as 16 shown in FIG. 1. Below the corbel portion 16, the sleeve includes a barrel portion 54 of substantially constant diameter but larger than section 50. The lower end of the sleeve 42 terminates in a bottom portion 58. The sleeve may be formed from a single panel and joined along a common edge, or in the alternative, multiple panels having multiple seams.

In the embodiment shown in FIG. 3, two sheets of material 44, 46, each having substantially identical shapes are lain one over the other and sewn, stitched or fused together about their periphery 60 to form the sock-like structure 42. The bonding 62 can be done in one of a number of ways including edge stitching, overlap stitching, French-seam stitching, using an adhesive, sonic welding, fusing or the like. The purpose is to bind the edges 64 of the material 44, 46 as closely together as possible and to prevent separation when installed. Alternatively, the edges 64 of the two sheets 44, 46 can be bonded together using an adhesive tape, or fused together using an adhesive or other method suitable for creating a substantially water tight seam.

Each sheet 44, 46 of the liner fabric may be comprised of fabric and fiber material which is somewhat elastic. Materials have been tested which can expand up to 150% of its non-stretched diameter. In a preferred embodiment the sock 42 comprises substantially little longitudinal stretching characteristics, but it may be preferred to use such a material to accommodate small variances in geometries. However, in one embodiment of the invention, it has been found that the combination of different layers having the ability to expand up to as much as 25% of their original diameter works better. So, for example a sleeve having a fabricated diameter of 4 feet should be able to expand up to and including a 5-foot diameter manhole and remain its structural integrity. In the preferred embodiment of the invention, we have found that expansion up to 10% of the original diameter is sufficient.

In a preferred embodiment of the invention, a suitable fabric for the sock 42 is comprised of a plurality of layers including a polymer layer made of PVC or other polymer resistant to chemical breakdown, one or more layers of felt, followed by one or more layers of more rigid material such as stranded or oriented fiberglass. In a more preferred embodiment, the fabric to be used is comprised of layers of PVC, a high-loft stretchable non-woven fleece, followed by one or more layers of fiberglass. As shown in the figures, the fabric includes an elastic or stretchable acid-resistant impermeable polymer film 66 such as polyurethane, PVC, polyethylene, ethylene, or other materials impermeable yet flexible polymers including those from the vinyl group. Attached to one side of the elastic polymer film 66 is a fibrous mat, felt, or other fibrous material 68 providing a large absorbent surface area, some compression, and the ability to retain and cohesively interact with a resin described below. The fibrous mat 68 may be weld bonded to the surface of the polymer sheet 66 or may be physically captured within the polymer at the time of extrusion.

Adjacent the felt or fibrous mat 68 is a more structural layer 70 formed by sheets of oriented-strands or random-strands or mesh having limited elasticity. Such sheets of materials include strands of glass fibers, often referred to as fiberglass. The sheets 70 of fiberglass are lain down onto the mat 68 in an overlapping pattern for reasons that will become more readily apparent below. Alternatively, rather than being positioned on the exterior of the mat 68, it is conceivable the overlapping layers of fiberglass 70 may also be sandwiched between one or more fibrous mat layers 68 or even interwoven with one or more layers of mat 68 to provide some structural properties to the sleeve. Regardless of the configuration, the structural layer 70 is temporarily held adjacent the fibrous mat 68. Alternatively the layers relative positions can be maintained using the method generally known as needle punching where strands of one material are temporarily forced into the adjacent material, thus keeping the relative positions. In either of these configurations, the fiberglass layers or sheets 70 are permitted to slide relative to one another to allow upon installation of the liner in the manhole.

The shape of the plurality of sheets or panels 44, 46 comprising the sock 42 shown in FIG. 3 are intended for use in symmetrical manhole geometries and preferably cut and assembled prior to installation. Presently the multi-layer fabric used to form the sleeve is being produced by Applied Felt in Martinsville, Va., sold under the brand name "AQUA CURE RP."

With respect to the sleeve or sock 42 shown in FIG. 4, substantially the same construction to that described above is followed in terms of material and arrangement. The difference between the embodiments is the shape of the panels of material 44, 46 forming the sleeve or sock 42. As is readily apparent from the image of FIG. 4, the profile of each of the panels is asymmetrical to account for the asymmetrical geometry of the corbel such as in FIG. 2 and designated by numeral 30. Although the embodiment describes the sleeve 42 to be formed from two sheets of material, the sleeve 42 may actually be formed from one or more panels depending upon the specific applications. It has been found that sleeves 42 formed from a single panel and having a single seam do not always conform well to the manhole geometry. Sleeves comprised of multiple panels cut after the manhole has been measured provide a better fit.

In operation, the sleeve or sock 42 is manufactured with the fiberglass 70 and the fibrous mat or felt 68 located and exposed on the outside of the sock 42. Resin is then applied to the exterior of the sock and manipulated manually by hand or machine so that as much of the fiberglass 70 and mat 68 are impregnated and have absorbed the resin. A preferred resin includes a two part epoxy having parts A and B available from Rhino Liner Systems and labels as Rhino 1310T (resin) and Rhino 3138 (hardener).

More particularly, as originally formed the fabric fibers 70 and 68 of the sock 42 are on the outside of the sleeve, while the polymer film coating 66 is on the interior. After the fibrous material (glass 70 and mat 68) is fully impregnated or soaked, the upper end of the sock 42 is placed at the top or upper end of the manhole and lowered into the manhole. The resin-soaked fibrous surface is positioned at substantially the correct level or height to coincide with the geometric shape of the manhole profile. The bottom portion 58 of the bag 42 lays over the bench or bottom pad 28 and the accompanying inverted channel formed therein.

Once the sock 42 is in position, an inflatable bladder is disposed inside the sock 42 so as to substantially fill the bag along its entire length. The reader is referred to U.S. Pat. No. 7,670,086, the contents of which are incorporated herein by reference for a more detailed description of the bladder. With the bladder in position, it is inflated with air or a liquid under pressure, from a convenient fluid source (not shown). As the bladder inflates, the sock 42 is stretched circumferentially and pressed into engagement with the internal walls of the manhole, placing the resin soaked fibrous material tightly against the walls of the manhole. As the sock 42 is inflated and expanded, the overlapping sheets of fiberglass 70, normally not elastic, are able to overcome the stitching/needle press temporary fix and slide past one another to accommodate the expansion of the adjacent mat 68 and the stretching of the polymer layer 66. The anticipated expansion is taken into consideration when orienting and positioning the structural layers 70 relative to one another. The bladder also forces the bottom 58 of the sock 42 downwardly against the bottom pad or bench 28 and into the inverted channel. The uncured resin adheres the fibrous material of the sock 42 to the walls of the manhole including the inverted channel and bench. Upon curing of the resin, the sheets of fiberglass 70 are bonded in place with the felt 68 to the inner wall of the manhole. The expansion of the bladder assures that no large bubbles or voids reside between the sock and channel, bench and wall of the manhole. Also, the stretching of the sock 42 to the enlarged diameter of the manhole tends to conform closely to the geometry of the manhole and reduces undesirable folds or wrinkles in the sock.

After sock 42 has been stretched into contact with the manhole walls, the bladder is deflated and removed from the manhole 10. Alternatively the bladder may remain in place until the resin is fully set. To expedite setting time, the resin can also be accelerated by the addition of a catalyst such as heat. For a detailed description of such a method, the reader is referred to U.S. Pat. Nos. 5,265,981, 5,490,744, 5,915,886 and 7,018,691, the contents of which are incorporated herein by reference.

In an alternate embodiment of the invention, the socks or sleeves 42 may be open at the bottom. A separate layer of the manhole liner material may be placed in the manhole prior to insertion of the sock 42 to cover and conform to the inner surface of the bench or bottom pad 28 and formed into the associated inverted channel. This material may be separately impregnated with a resin and placed into position and cured prior to insertion of the sock. In such an embodiment, the material would extend upwardly from the bottom pad and up a predetermined distance from the bottom along the inner wall of the manhole barrel so that when the sock is lowered into position, it overlaps the separately installed liner material covering the bottom pad.

From the foregoing it can be discerned the invention is a liner for a manhole comprising a tubular member having a geometry substantially approximating the geometry of the manhole, the tubular member comprising at least one panel having a plurality of layers including an impermeable inner polymer layer, at least one intermediate and porous felt layer, and an outer structural layer including expandable strands of fiberglass. The outer layer of expandable strands of fiberglass may be achieved using overlapping sheets of fiberglass such that upon expansion of the liner in the manhole, the overlapping sheets of fiberglass slide past each other to accommodate for dimensional changes in said outer layer. Alternatively the outer layer of overlapping fiberglass may include sheets of random oriented fiberglass wherein individual fibers of fiberglass are able to move relative to other fibers. In either embodiment it is envisioned that the outer layer of fiberglass is bonded temporarily to the porous felt layer. The temporary bonding may be achieved in a number of ways including needle punched to the intermediate layer to temporarily maintain a relative position of said outer layer to said intermediate layer. The outer structural layer can also be fixed in rigid relation to the porous felt layer and the impermeable polymer layer by an adhesive.

In another form, a liner is provided for a manhole including a tubular member to be disposed in the manhole, the tubular member having an opening at one end and closed at a second and opposite end. The tubular member is preferably made from a fabric inflatable in a direction perpendicular to a longitudinal axis of the. In this form of the invention, the fabric is comprised of an impermeable polymer inner layer, at least one permeable and porous stretchable intermediate layer; and at least one permeable and porous inelastic outer structural layer formed from a plurality of glass fibers that are able to move relative to one another upon inflation of the tubular member to accommodate expansion of the impermeable inner layer and the stretchable intermediate layer. It is further contemplated the invention comprises an adhesive adhering the stretchable intermediate layer and the outer structural layer to the manhole.

The liner fabric is formed by a plurality of panels, each fused or bonded to an adjacent panel forming an impermeable seam. The outer structural layer is maintained in position relative to the intermediate layer by forcing pieces of the outer structural layer into the intermediate layer. They may be achieved by temporary adhering the outer structural layer to the intermediate layer. In this form of the invention, the outer structural layer comprises a plurality of sheets of stranded glass fibers overlapping one another by a predetermined distance based upon the amount of expansion of said tubular member when expanded into the manhole. The outer structural layer may be comprised of at least one sheet of randomly oriented stranded fibers loosely associated with one another wherein each randomly oriented stranded fiber is permitted to move relative to one another upon expansion of said tubular member within the manhole. Alternatively, the outer structural layer is permanently affixed relative to the intermediate layer and to the manhole by the adhesive.

In yet another form of the invention, a manhole liner generally in the form of a tube is provided approximating the shape of the manhole. In this form of the invention, the tube includes an impermeable and elastic polymer layer selected from the group of polyvinyl chlorides, polyurethanes, polyvinyl ethylene, and the vinyl chemistry; an intermediate layer selected from the group of randomly oriented fibers including felt; and an outer layer selected from a group of glass fibers including fiberglass. The intermediate layer is maintained in relative position to the outer layer by a temporary bond. The outer layer is temporarily maintained in relative position to the intermediate layer by forcing a plurality of strands of the outer layer into the intermediate layer. Moreover, the outer layer of the fabric is allowed to move relative to the intermediate fabric when the liner is stretched. This is achieved by both the intermediate and the outer layers being porous and permeable.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

APPENDIX

10 Manhole FIG. 1
12 Bottom pad
14 Barrel
16 Corbel, plenum, or cone
18 Adjusting rings
20 Cast iron ring or frame
22 Cast iron lid or cover
24 Manhole FIG. 2
26 Bottom pad
28 Barrel
30 Corbel, plenum or cone
32 Adjusting rings
34 Cast iron ring or frame
36 Manhole cover
38
40 Liner
42 Sock or bag
44 Material upper sheet
46 Material lower sheet
48 Chimney portion
50 Taper
52 Taper
54 Barrel section
56
58 Bottom section
60 Periphery 62 Stitching
64 Edge of 44, 46
66 Polymer film or sheet
68 Fibrous mat
70 Standard-glass layer/Fiberglass
72
74
76
78
80
82
84
86

The invention claimed is:

1. A liner for a manhole, comprising; a tubular member having a geometry substantially approximating the geometry of the manhole, said tubular member comprising at least one panel having a plurality of layers including an impermeable inner polymer layer, at least one intermediate and porous felt layer, and an outer structural layer including overlapping strands of fiberglass oriented in a manner such that said outer layer is able to be stretched wherein said outer layer of overlapping strands of fiberglass include sheets of random oriented fiberglass wherein individual fibers of fiberglass are able to move relative to other fibers and an amount of overlap between each sheet of fiberglass is dependent upon anticipated expansion of the liner when installed in the manhole.

2. The liner as defined in claim 1, wherein said outer layer of overlapping strands of fiberglass include overlapping sheets of fiberglass such that upon expansion of the liner in the manhole, the overlapping sheets of fiberglass slide past each other to accommodate for dimensional changes in said outer layer.

3. The liner as defined in claim 1, wherein said outer layer of fiberglass is bonded temporarily to said porous felt layer.

4. The liner as defined in claim 1, wherein said outer layer is needle punched to said intermediate layer to temporarily maintain a relative position of said outer layer to said intermediate layer.

5. The liner as defined in claim 1, wherein said outer structural layer is fixed in rigid relation to said porous felt layer and said impermeable polymer layer by an adhesive bonding said porous felt layer and said outer structural layer to the manhole.

6. A liner for a manhole, comprising:
a tubular member for placement in the manhole, said tubular member having an opening at one end and closed at a second and opposite end, said tubular member made from a fabric inflatable in a direction perpendicular to a longitudinal axis of, said fabric including:
an impermeable polymer inner layer;
at least one permeable and porous stretchable intermediate layer; and
at least one permeable and porous inelastic outer structural layer formed from a plurality of inelastic stranded glass fibers that are able to move relative to one another upon inflation of said tubular member to accommodate expansion of said impermeable inner layer and said stretchable intermediate layer.

7. The liner as defined in claim 6, further comprising an adhesive for adhering said stretchable intermediate layer and said outer structural layer to the manhole.

8. The liner as defined in claim 6, wherein said fabric is formed by a plurality of panels, each attached to an adjacent panel forming an impermeable seam.

9. The liner as defined in claim 7, wherein said adhesive comprising a two part adhesive comprising a hardening component and a resin component.

10. The liner as defined in claim 9, wherein said outer structural layer is maintained in position relative to said intermediate layer by forcing pieces of said outer structural layer into said intermediate layer.

11. The liner as defined in claim 9, wherein said outer structural layer is maintained in position relative to said intermediate layer by temporary attaching of said outer structural layer to said intermediate layer.

12. The liner as defined in claim 9, wherein said outer structural layer comprises a plurality of sheets of stranded glass fibers overlapping one another by a predetermined distance based upon the amount of expansion of said tubular member when expanded into the manhole.

13. The liner as defined in claim 9, wherein said outer structural layer comprises at least one sheet of randomly oriented stranded fibers loosely associated with one another and wherein each randomly oriented stranded fiber is permitted to move relative to one another upon expansion of said tubular member within the manhole.

14. The liner as defined in claim 9, wherein said outer structural layer is permanently affixed relative to said intermediate layer and to said manhole by said adhesive.

15. A manhole liner formed generally into a tubular member approximating the shape of the manhole, the tubular member having an opening at one end and closed at a second and opposite end, said tubular member made from a fabric inflatable in a direction perpendicular to a longitudinal axis thereof, said liner comprising;
an impermeable and elastic polymer inner layer selected from the group of polyvinyl chlorides, polyurethanes, polyvinyl ethylene, and the vinyl chemistry;
an intermediate permeable and porous stretchable layer selected from the group of randomly oriented fibers including felt; and
a permeable and porous inelastic outer layer selected from a group of inelastic fibers including fiberglass which move relative to one another upon inflation of said tubular member to accommodate expansion of said impermeable inner layer and said stretchable intermediate layer.

16. The manhole liner fabric as defined in claim 15, wherein said intermediate layer is maintained in relative position to said outer layer by temporary attachment.

17. The manhole liner fabric as defined in claim 15, wherein said outer layer is temporarily maintained in relative position to said intermediate layer by forcing a plurality of strands of said outer layer into said intermediate layer.

18. The manhole liner fabric as defined in claim 15, wherein said outer layer of said fabric is allowed to move relative to said intermediate fabric when the liner is stretched.

* * * * *